United States Patent

[11] 3,566,089

[72] Inventors Akira Yokoyama; Harunaga Neya; Yoshinori Yoshimune; Nobuhiro Tomabechi; Toshio Imai, Kawasaki-shi, Japan
[21] Appl. No. 693,411
[22] Filed Dec. 26, 1967
[45] Patented Feb. 23, 1971
[73] Assignee The General Corporation Kawasaki-shi, Japan
[32] Priority Dec. 29, 1966, Apr. 18, 1967, Apr. 24, 1967, June 14, 1967
[33] Japan
[31] 41-85653, 42-24225, 42-25844 and 42-37,766

[54] METHOD FOR DISPLAYING THE CONTENTS OF MAGNETIC CORE REGISTER
7 Claims, 11 Drawing Figs.

[52] U.S. Cl. ........ 235/92, 315/84.6
[51] Int. Cl. ........ G09f 9/00, H03k 23/18
[50] Field of Search ........ 235/92 (65, 10, 70, 6, 63, 13); 315/84.5, 84.6

[56] References Cited
UNITED STATES PATENTS
3,392,270 7/1968 Boucke ........ 235/92

*Primary Examiner*—Maynard R. Wilbur
*Assistant Examiner*—Joseph M. Thesz, Jr.
*Attorney*—Ernest G. Montague

ABSTRACT: A displaying system for the contents of a magnetic core register on a display device having one common terminal and 10 numeral terminals such as a Nixie tube, one display device being annexed to each unit of the register, the numeral terminals of which show the same numerals of each display device and are commonly connected, and are switched over, and driven by the output of a 10-progress ring counter which proceeds by stepping pulses in a constant cycle.

FIG. 1.
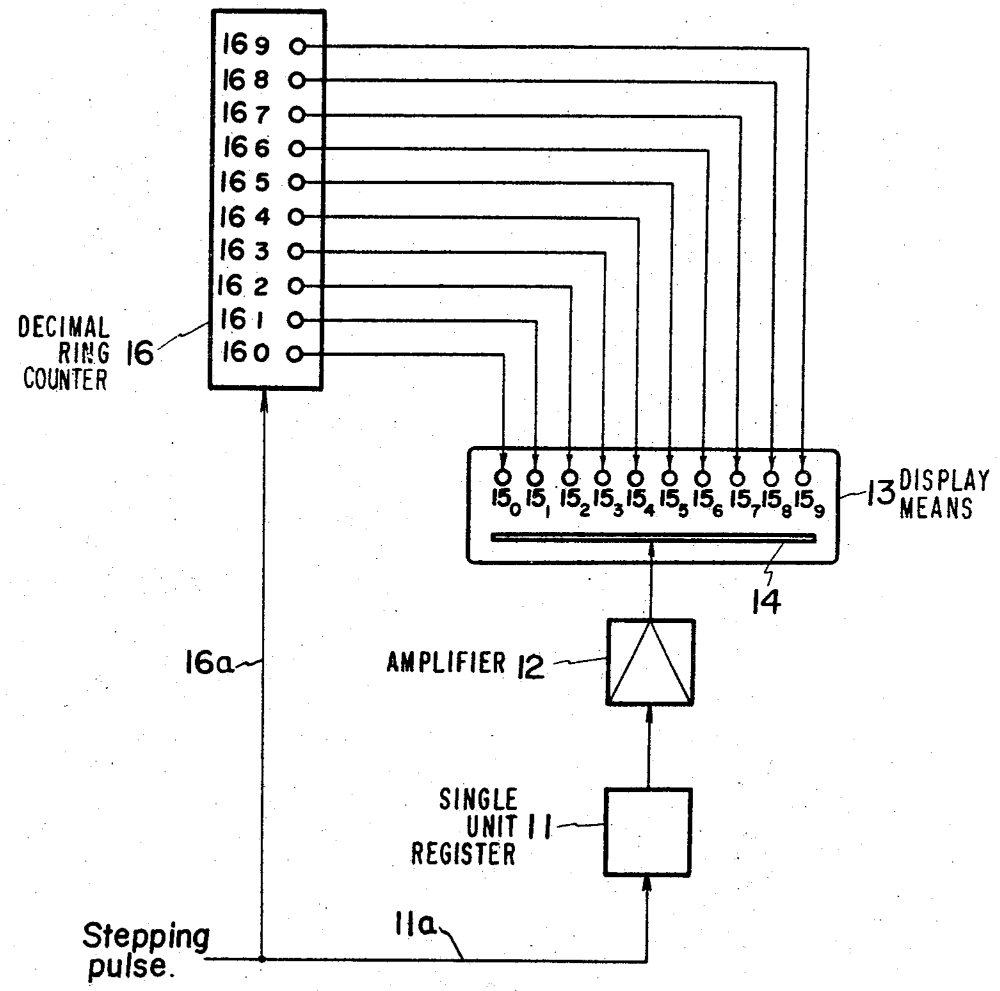
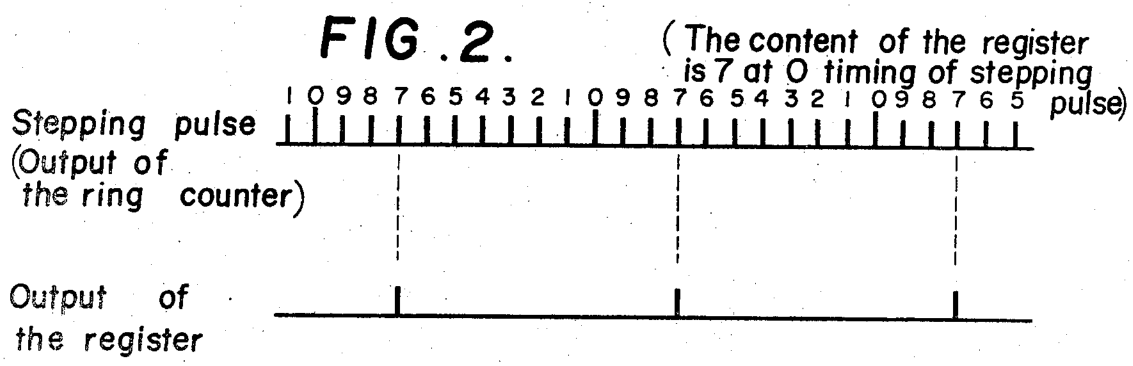
Inventors:
Akira Yokoyama
Harunaga Neya
Yoshinori Yoshimura
Nobuhiro Yamabeshi
Yoshio Imai
By Lucas Montague
attorney Inventors:
Akira Yokoyama
Harunaga Aoya
Yoshinori Yoshimune
Nobuhiro Funabashi
Toshio Imai
By [signature]
Attorney Inventors
By
attorney Inventors:

Inventors
Akira Yokoyama
Harunaga Koya
Yoshinori Yoshimura
Nobuhiro Funabashi
Tokio Imai
By Ernest Montague
Attorney Inventors
By
Attorney Inventors:
Akira Yokoyama
Haruo Ueya
Yoshinori Yoshimura
Takahiro Funabashi
Toshio Imai
By Burgess, Dinklage & Sprung
Attorneys Inventors
Akira Yokogawa
By
Attorney Inventors:
Akira Yokoyama
Harumasa Oya
Yoshiyasu Yoshimune
Toshihiro Tonosaki
Fuchio Imai
By Ernest G. Montague
Attorney

METHOD FOR DISPLAYING THE CONTENTS OF MAGNETIC CORE REGISTER

The present invention relates to a method for displaying the numerical values received in the register comprising a magnetic core matrix, *i.e.* a magnetic core register.

Since a magnetic core register is a reliable, small-sized, and an inexpensive register, it has been widely employed for the memory device of an electronic computer. However, there are several disadvantages in applying a magnetic core matrix to a small-sized calculating device such as a desk calculator. One of the disadvantages is that the numerical values received in a magnetic core matrix can not immediately be displayed. Consequently, it has been customary to carry out the display by transferring the contents of a magnetic core matrix to another register in which the contents can be immediately displayed. However inexpensive a magnetic core matrix may be when used instead of only two or three registers for a desk calculator, it would increase the expense as a whole and offset the merits of a magnetic core matrix to provide a separate, extra display register.

For example, in a conventional method, in order to display the register contents by means of a Nixie tube, it is necessary for the display register to employ four flip-flop circuits for each unit plus a binary-decimal decoder composed of approximately 30 diodes for each unit and 10 amplifiers to drive the Nixie tube. Accordingly, it can be easily understood that if the register has 16 units the number of transistors and diodes comprising the semiconductor device is determined as follows.

$2\times4\times16+10\times16=288$ (transistors)

$30\times16+2\times4\times16=608$ (diodes)

It is an object of the present invention to carry out an effective display by means of as few annexed circuits as possible and to offer an inexpensive calculating device.

It is another object of the present invention to provide a dynamic display of the contents of a magnetic core register comprising at least one unit register, a display means having a common terminal operatively connected to the unit register and 10 numeral terminals comprising a plurality of Nixie tubes equal to the number of units of the unit register, a 10-progress ring counter having output terminals comprising 10 number terminals connected respectively to the 10 numeral terminals of the display means, the unit register and the ring counter being concurrently provided with common stepping pulses, the 10 numeral terminals of the display means being successively driven and switched over by the 10 number terminals, respectively, the latter being successively driven and switched over by the stepping pulses, and the display means including means for displaying numerals corresponding to a numeral terminal to be displayed and for displaying a numeral corresponding to the contents of the unit register when the common terminal and the numeral terminal are concurrently activated.

With these and other objects in view, which will become apparent in the following detailed description, the present invention will be clearly understood in connection with the accompanying drawings in which:

FIG. 1 is a block diagram illustrating a dynamic display in accordance with the present invention with respect of one-unit register;

FIG. 2 is a time chart explaining FIG. 1;

Figure 8A:
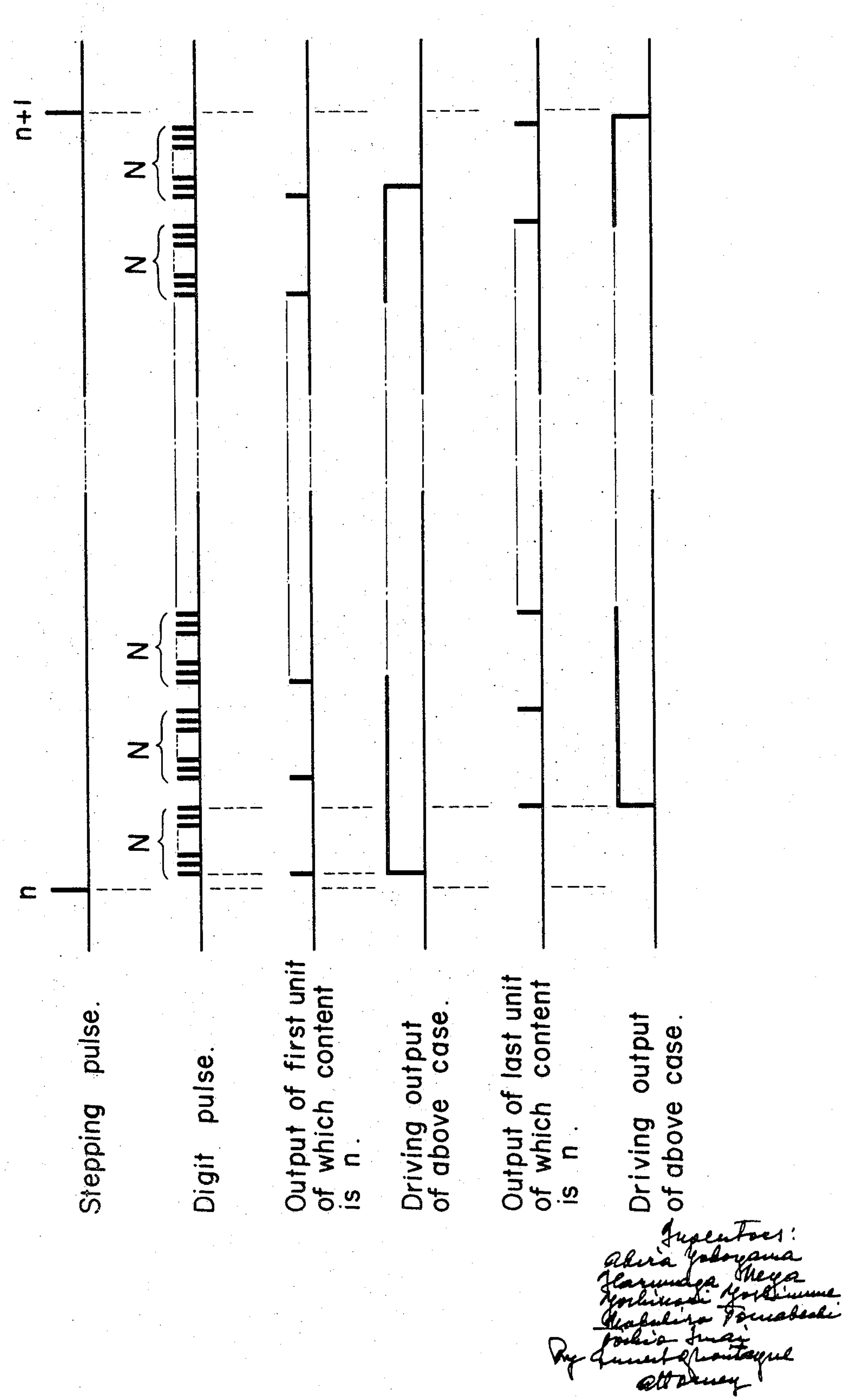
Figure 8B:
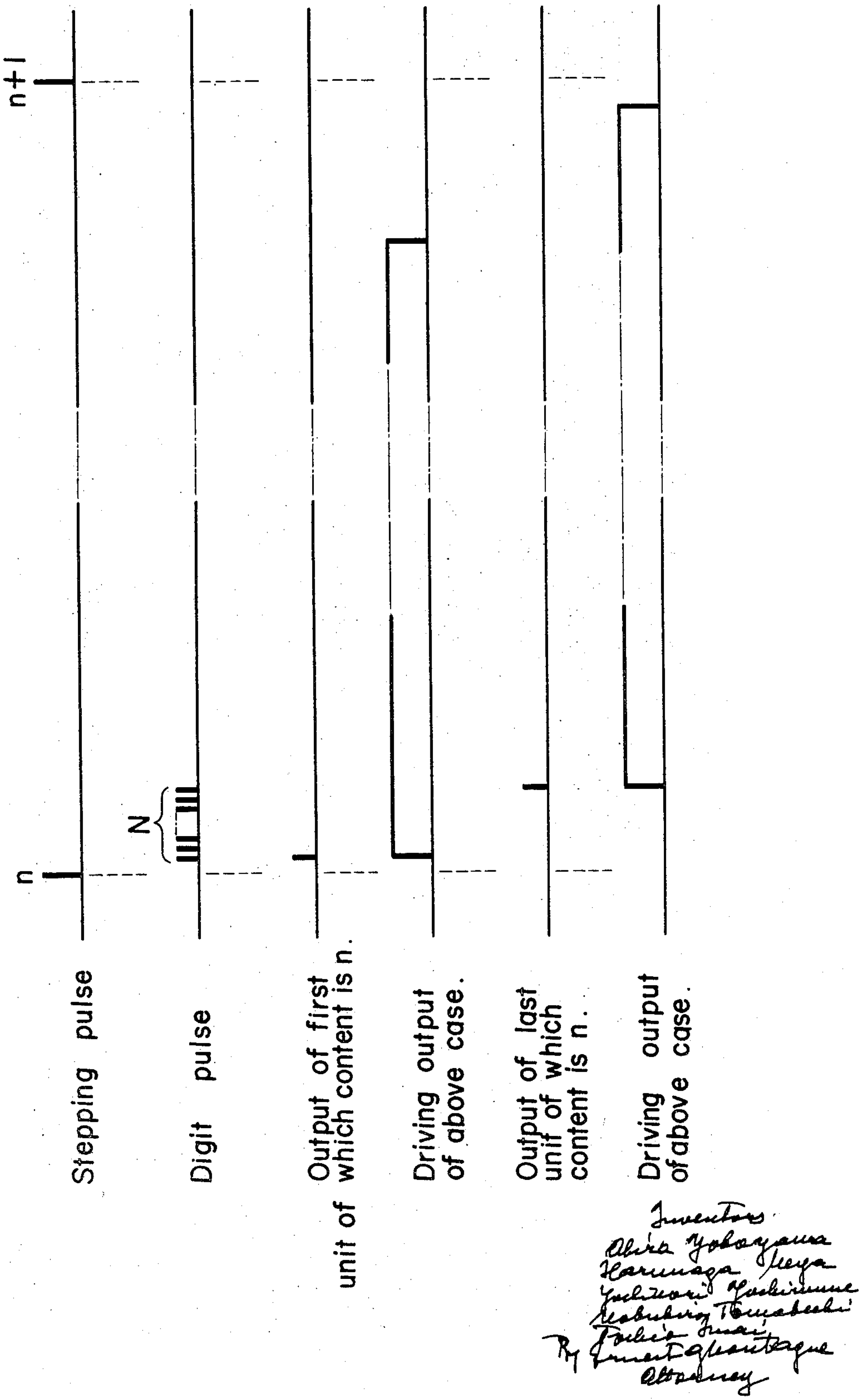

FIGS. 8(*a*) and (*b*) are time charts for Example C; and

Figure 9A:
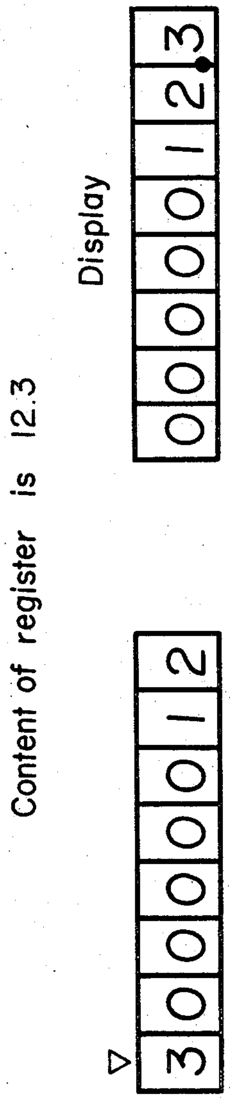
Figure 9B:
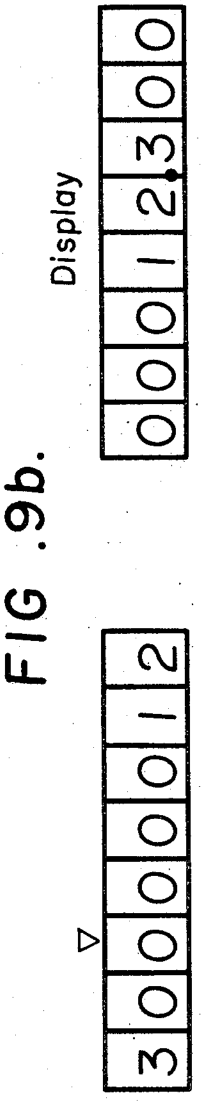

FIGS. 9 (*a*) and (*b*) are illustrations showing an endless register of the present invention.

Although the dynamic display which constitutes the basis of the present invention can be applied to an N-progress register, the explanation herein is presented about a decimal register.

Referring now to the drawings and more particularly to FIG. 1, a dynamic display in accordance with the present invention comprises a single-unit register 11 of a decimal counter-type provided which produces one output per 10 inputs; an amplifier 12 is connected thereto, and a display means 13 having one common terminal 14 and 10 numeral terminals $15_0$, $15_1$, $15_2$, ... $15_9$ corresponding to the digits 0—9, respectively. A decimal ring counter 16 is also provided having 10 output terminals, $16_0$, $16_1$, ... $16_9$ corresponding to the numbers 0—9, respectively, from any one of which the output is always produced, and for each input, the terminal producing the output is successively switched over to the adjacent terminal.

The same stepping pulses are commonly supplied to the register 11 and to the ring counter 16 via lines 11*a* and 16*a*, respectively, and a digit *n* is displayed only when the signal is concurrently sent to both, the common terminal 14 and a numeral terminal 15. The identical digit is stroboscopically displayed and continuously observed due to the effect of afterimage of the eye, because the output is always produced from the identical terminal of the ring counter 16 at the time when the output is produced from the register 11, because both the register 11 and the ring counter 16, are decimals.

Which digit will be displayed depends on the contents of the register 11 at the standard timing. For example, referring to FIG. 2, assume the standard timing is a 0 timing when the output is produced from the terminal corresponding to 0 and assume the contents of the register 11 at the 0 timing to be $10-n$ ($9\geqq n\geqq 0$). The digit *n* is displayed, because the output is produced from the register 11 at the timing when *n* stepping pulses enter after the 0 timing and the ring counter 16 produces the output at that timing in the terminal corresponding to the numeral terminal 15*n*.

Figure 3:
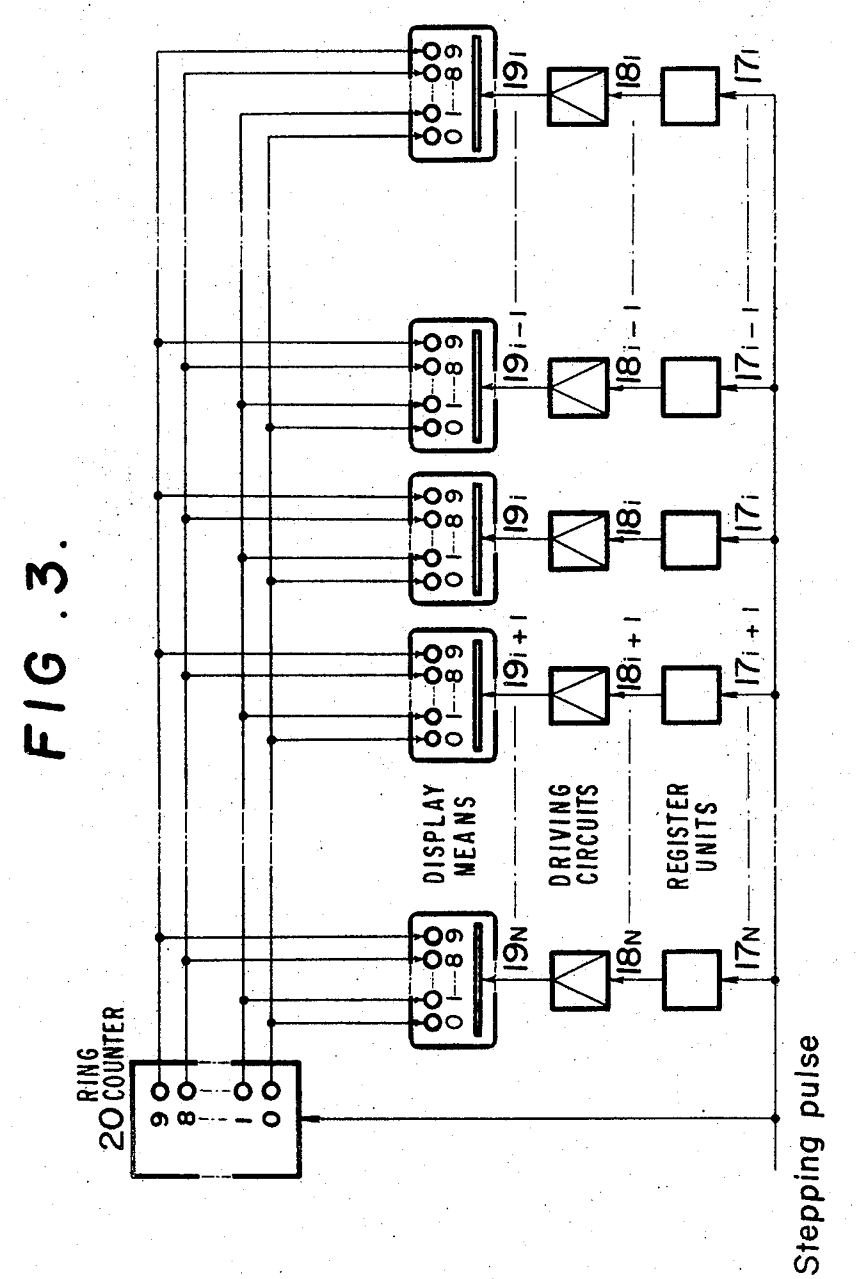
FIG. 3 is a block diagram of the dynamic display of the present invention with respect to an N-unit register.

FIG. 3 shows an example of an N-unit register in accordance with the present invention. Display means $19i$ $19i\text{-}1$ ... $19_1$ are the display means corresponding to each unit, respectively, and the numeral terminals with identical digits are commonly connected in order to be driven by one ring counter 20. Register units $17_N$ ... $17_{i+1}$ $17_i$ $17_{i-1}$ ... $17_1$ are connected to driving circuits of the register units $18_N$ ... $18_{i+1}$ $18_i$ $18_{i-1}$ $18_1$.

In such a display system it is not necessary to employ a decoder, but only one driving circuit of the display means will do for each unit. In contrast to a conventional method, *i.e.* the static display method mentioned above, a decimal ring counter is employed. Even so, only one set will do regardless of the number of units. Since a decimal ring counter can be composed of our flip-flop circuits and one decoder, the number of transistors and diodes to be employed for the displaying of 16 units is figured out as follows even when an amplifier is provided for each unit.

$2\times4\times16+16+2\times4+10=162$ (transistors)

$2\times4\times16+2\times4+30=166$ (diodes)

When compared with the example mentioned above, the number of elements is noticeably reduced.

Such a method can be applied only to a register the units of which are of the counter-type, and it is not applicable directly to a magnetic core register because of the difficulty of converting same to a counter-type.

The numerals in the latter example show those when the content of a magnetic core register is once transferred to a counter-type register and then dynamic display is carried out. Though it is possible even in this method to reduce the number of elements to be employed in a conventional device, the present invention aims at a large reduction of elements by reading out the contents of each unit of a magnetic core register successively on the one-unit register and performing the dynamic display.

An easily conceivable method is the one referred to as the double dynamic display in which the Nixie tube display is performed by reading out the contents of the N-unit magnetic core register unit by unit on the one-unit counter-type register, repeating the process for the successive adjacent unit. According to this method, the time for displaying one digit becomes less than 1/10N of one display period in which the display of all the units N is completed. Since one display period must be less than 1/50 second in order that the flicker may not be felt as a result of the effects of afterimage, the display period of one digit in the case of 16 units becomes less than 1/8000 second, so that the effective display can not be performed by the Nixie tube in such a short period. (In the above-mentioned dynamic display the time for displaying one digit is 1/10 of one display period regardless of the number of units. Accordingly, when one display period is 1/50 second, the time for displaying one digit becomes 1/500 second, which is time enough for the Nixie tube to function).

In the present invention, the content of each unit of a magnetic core register is successively read out on the one-unit register by providing the digit pulse equal to or more than the number of units in the section between the successive two stepping pulses, and the drive output for the display circuit can be produced by the coincident circuit which produces the output only when the contents of the register coincides with that of the ring counter mentioned above. (Descriptions of such a coincident circuit will be omitted here because of many known examples. Since the information is usually destroyed after the content of a magnetic core register has been read out, the rewriting must be performed when a nondestruction is required in this displaying method. This is also known and need not be illustrated).

Figure 4:
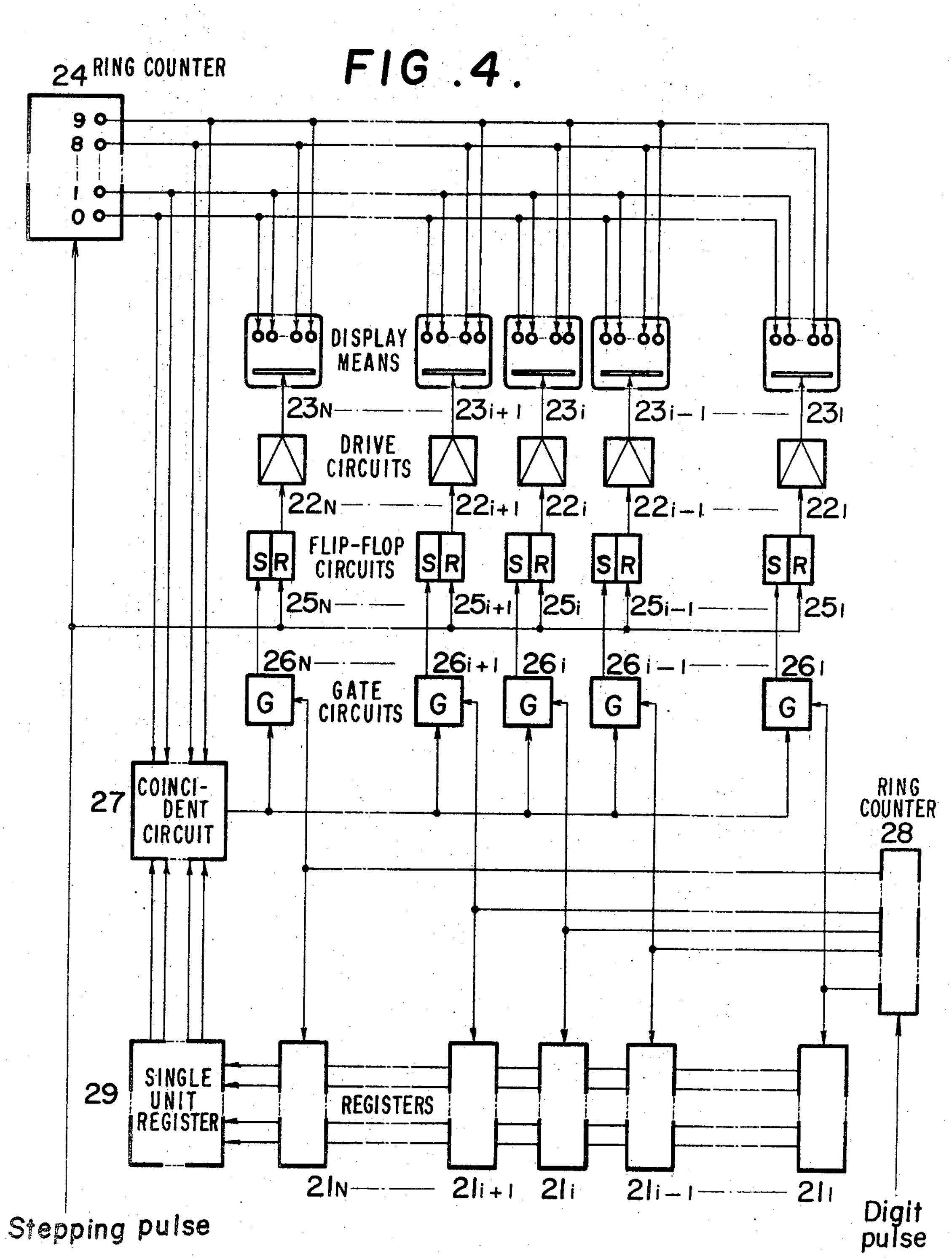
FIG. 4 is a block diagram illustrating an example of the present invention (Example A)
Figure 5:
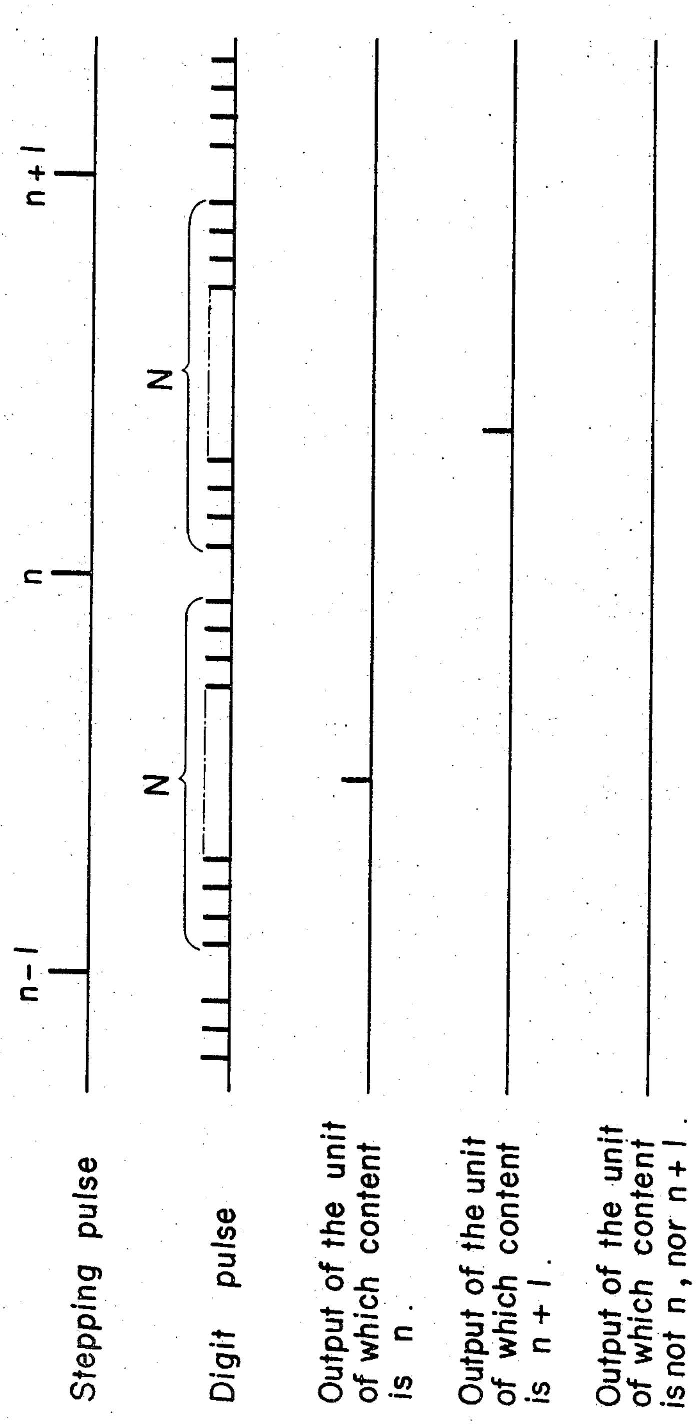
FIG. 5 is a time chart for Example A.

In the examples of the present invention, it is possible to make a few modifications. One is a system shown in FIG. 4, the time chart of which is shown in FIG. 5. In FIG. 4, flip-flops $(25_N)$... $(25_{i+1})$ $(25_i)$ $(25_{i-1})$... $(25_1)$ are the flip-flop circuits belonging to each unit, respectively, and gate circuits $(26_N)$ ... $(26_{i+1})$ $(26_i)$ $(26_{i-1})$ ... $(26_1)$ are the gate circuits which belong to each unit respectively and which supply the output of coincident circuit (27) to one of the corresponding flip-flop circuits at the same time with the selection of the register unit. N-progress ring counter 28 selects units, and a single-unit register 29 is provided. As shown in FIG. 5, N digit pulses are provided in the interval of two successive stepping pulses, and the output is produced from the coincident circuit 27 only when the contents of the register 29 coincides with the digit of ring counter 24 representing the following stepping pulse.

Now, let us examine the function of the stepping pulse from the $n-1$ timing to the $n$ timing. During this period, the contents of the register 21 is successively transferred unit by unit to the single-unit register 29. Though the process may start at any unit, let it be assumed that the reading out is performed in the order of the register units $(21_1)$ $(21_2)$ ... $(21_N)$. Since the gate circuits $(26_1)$ $(26_2)$ ... $(26_N)$ open successively at the same time with the selection of the register units, the gate circuit $(26_i)$ is open, for example, when the content of the register unit $(21_i)$ is transferred to the register (29). If the content of the register (29) is equal to $n$, the output is produced from the coincident circuit (27), and it passes through the gate circuit $(26_i)$and sets the flip-flop circuit $(25_i)$. If the content is not equal to $n$, the output is not produced and the flip-flop circuit $(25_i)$ is not set. Thus, just prior to the stepping pulse of the $n$ timing, the flip-flop circuit corresponding to the unit of the register whose content is $n$ is set. Since the stepping pulse resets the group of flip-flop circuits $(25_1)$ $(25_2)$ ... $(25_N)$ commonly, the output is produced from the flip-flop circuit in the set state, and it drives the common terminal corresponding to display means $23_N$ via drive circuit $22_N$. Meanwhile, since the terminal controlling the digit $n$ is driven by the ring counter 24 at the $n$ timing of the stepping pulse, the display means corresponding to the register unit having the content $n$ carry out the dynamic display of the digit $n$.

In this method, it is necessary to employ N units of flip-flop circuits and N units of gate circuits. However, since the gate circuit can be composed of 2 diodes, this method is much simpler and offsets the increase of the coincident circuits 27 when compared with the conventional method requiring $4n$ units of flip-flop circuits and N units of decoder. Furthermore, the register 29 need not be of the counter-type so far as it coincides with the ring counter 24. In this method, it is necessary to provide N units of wiring to the group of gate circuits from the ring counter 28. Though the cost of material does not matter, there are problems in assembling and especially in print wiring. The method described hereinafter is the modification in this respect.

Figure 6:
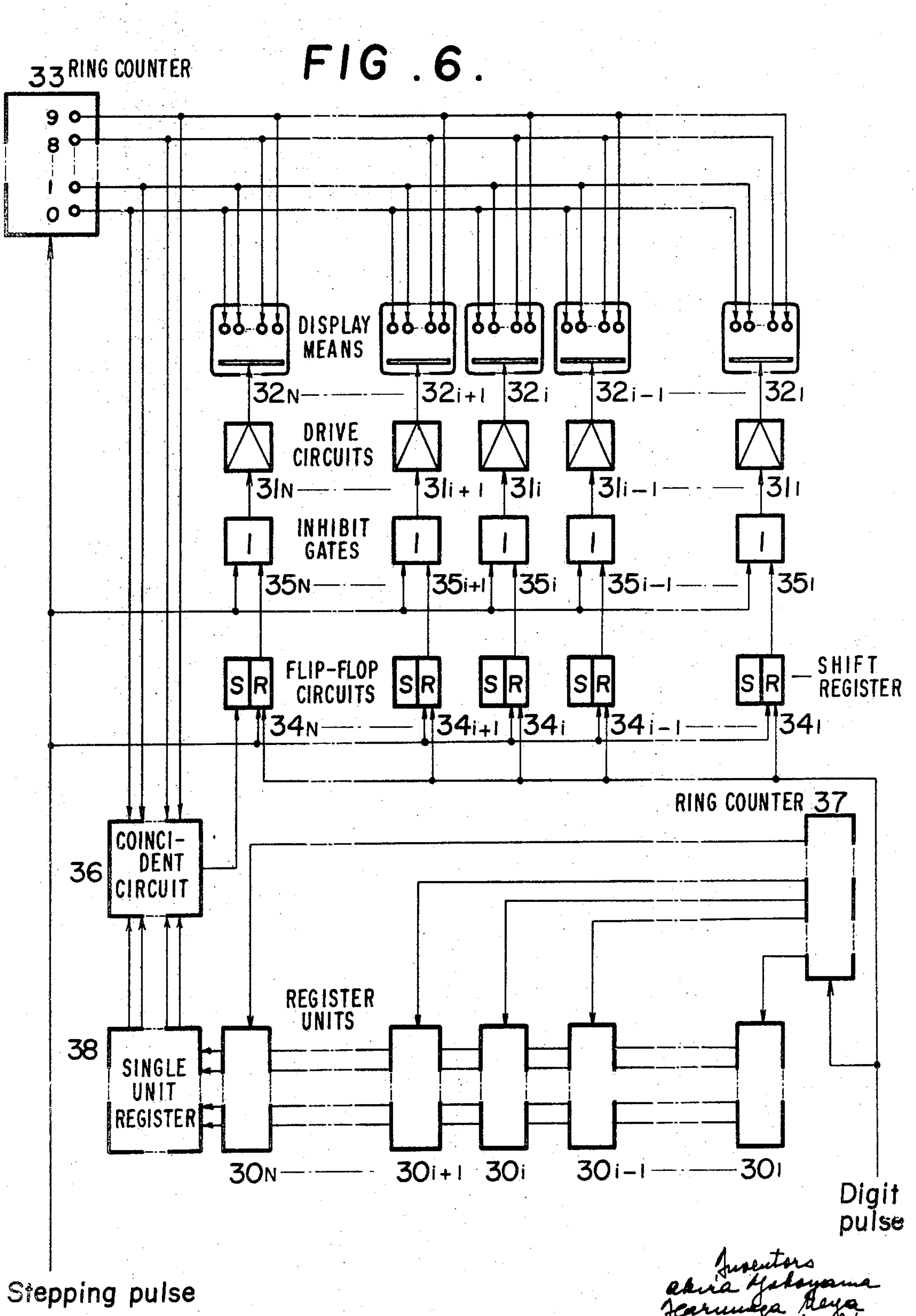
FIG. 6 is a block diagram of another example of the present invention (Example B)

Referring now again to the drawings and more particularly to FIG. 6, a system in accordance with the present invention comprises a group of flip-flop circuits $34_1$ ... $34_N$ which constitutes the shift register, and the content is shifted to the right by means of the digit pulses. The output produced from register 38 will only set the flip-flop circuit $34_N$.

If the content of the register unit $30_1$ read out on the register 38 in the digit pulse immediately after the stepping pulse, is $n$, the flip-flop circuit $34_N$ will be set. Since in the following digit pulse the content of the register unit $30_2$ is read out on the register 38 and at the same time the group of flip-flop circuits is shifted one unit to the right, the state of the flip-flop circuit $34_N$ is transferred to the flip-flop circuit $34_{N-1}$. If the content of the register unit $30_2$ is $n$, the flip-flop circuit $34_N$ will be set, and if not, the flip-flop circuit $34_N$ will not be set. Thus, after N units of digit pulses have been put in, that is, just prior to the $n$ timing of the stepping pulse, the state of the group of flip-flop circuits is in the same state as that in the system of FIG. 5, and the same dynamic display can be carried out by resetting the group of flip-flop circuits with the stepping pulse.

In this method, it is preferable to employ inhibit gates $35_N$ ... $35_{i+1}$, $35_i$, $35_{i-1}$... $35_1$ in order to inhibit the output to be produced from each flip-flop circuit during the shifting. When the group of flip-flop circuits is reset by the stepping pulses, this inhibition is released. The display means $32_N$, drive circuit $31_N$, ring counters 33 and 37 and coincident circuit 36 function as described above.

When compared with the first system, the number of wiring is reduced, but the elements rather increase in this method. Therefore, it depends on the construction and the size of the machinery to decide which method is more advantageous, even though it is generally difficult to make the decision.

Another embodiment constitutes a modification of the double dynamic display mentioned above, in which the group of flip-flop circuits is omitted. In this double dynamic display, the time for displaying is short, because the last digit pulse enters just prior to the following stepping pulse under the circumstances that the drive of one digit must be completed before the following stepping pulse at the latest. Furthermore, the display period is also short, because N units of digit pulse are provided in the section equally divided between the two successive stepping pulses.

Figure 7:
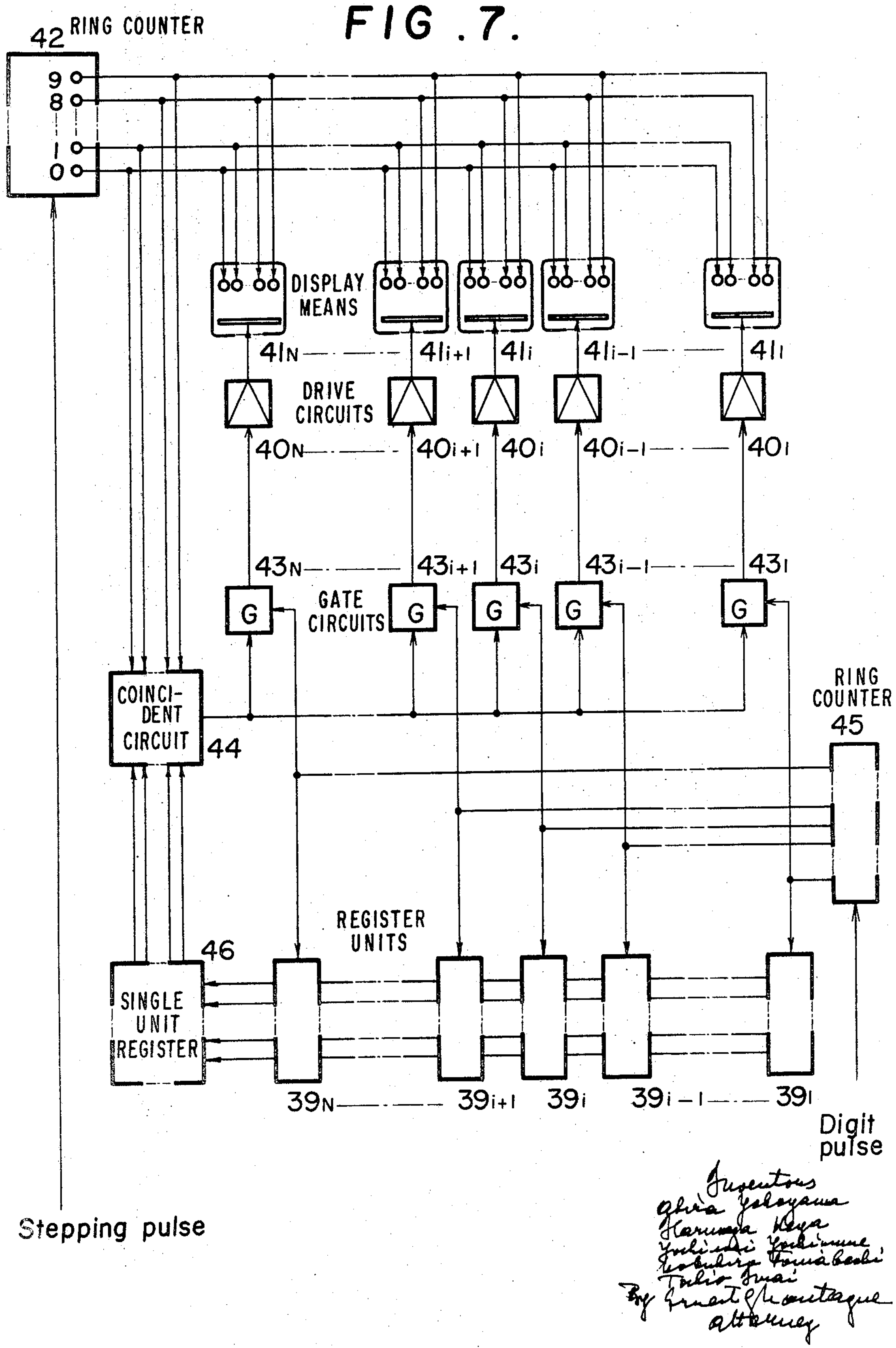
FIG. 7 is a block diagram of another example of the present invention (Example C)

In order to overcome these disadvantages, many more digit pulses than N may be employed, or much more shorter periods than 1/N of the period of the stepping pulse may be intensively provided immediately after the stepping pulse. The time constant of the driving circuit may be made long enough for the drive to terminate just prior to the following pulse. This circuit is illustrated in FIG. 7, and the time chart of the latter in FIG. 8 ($a$), and that of the former in FIG. 8 ($b$). In contrast with the two methods mentioned above, coincidence in this method must be produced at the timing of the stepping pulse just prior to the time when the drive terminates. FIG. 7 shows the coincident circuit 44 connected to the ring counter 42 and the single unit register 46, the latter receiving signals from the register units $39_N$. Gate circuits $43_N$ (G) are provided as well as drive circuits $40_N$ for the display means $41_N$ and a ring counter 45 as described above. Although in FIG. 8 ($a$) the output is produced many times in the interval of the two successive stepping pulses, it is only the initial one that is effective, because those outputs usually have no effect while the drive circuit is functioning. However, if the output is produced after the drive has terminated, the drive circuit is again triggered. In order to avoid this, the time constant of the drive output should be made longer than the time to produce the last output and shorter than the time to produce the following stepping pulse. In FIG. 8 (*b*), the selection of this time constant is not critical. If the time constant of the driving circuit is made long enough for the resetting by the following stepping pulse, such a consideration will not be needed. In this system, the time for displaying can be made approximately 1/10 of the display period regardless of the number of units, and moreover the display period can be made long enough for the Nixie tube to function regardless of the digit pulse.

According to the system mentioned above, when the contents of a magnetic core register is to be displayed, one unit will be enough to do for the display register regardless of the number of units, and moreover the dynamic display can be carried out even if this register is not a counter-type, so that it is possible to perform the display with far less elements including annexed circuits than in a conventional method. Besides, this method has the following advantage.

In a conventional static method for displaying, the contents of a certain unit is always displayed on the display means corresponding to the unit. Consequently, when it is necessary to alter the position of the decimal point due to the unit agreement, the content of the register must be shifted. Furthermore, in order to store one numerical value it is always necessary to employ a counter to store the position of the decimal point.

However, according to the present invention, the content of the register unit and the display can be freely set out in position if the initial reading-out of the unit starts at the optional position. In the first and the third systems mentioned above, another counter is needed for controlling the gate besides a counter for selecting units, but in the second method there is no need for an extra counter, because the counter for setting the standard timing can be used for that purpose.

When this system is used, the right end and the left end of the register are adjacent, and the numerical values can be received in an optional, convenient position for the operation control. This is called an endless register. One of the applications of the endless register is to omit a counter for storing the position of the decimal point. In this system, the numerical values are received in the register so that a place of decimals may be in the left end. FIGS. 9 (*a*)and 9 (*b*) show the examples in which 12.3 is received in the 8-unit register. The mark V indicates the position of the register unit appointed by the unit-selecting counter which selects the register units successively from the lower unit toward the higher units. The display means in the right end is to be selected at the standard timing. The display of the decimals is carried out by 8 lamps or discharge tubes, which may be regarded as a set of display means for the dynamic display by means of the unit-selecting counter.

As shown in FIGS. 9 (*a*) and 9 (*b*), in this system the position of the unit-selecting counter at the standard timing may be taken at any place so far as it is in the insignificant section covering the lowest unit and its right side and the left side of the highest unit of the significant number. Accordingly, since it is possible not only to display the mixed number completely by one unit-selecting counter, but also to restore the proper position of the decimals at any time when the insignificant section can be restored, even if the counter is used temporarily for another purpose during the operation, the number of counters can be reduced and the control becomes simplified. The explanation in detail about the method will be omitted here, because it relates to the method of operation and has no immediate relation to the present invention.

As described above, in the present invention the content of a magnetic core register can be displayed without many annexed circuits, and the system can be used very effectively for a small-sized calculating device. Moreover, though the present invention is concerned with the displaying system, it is also easily applicable to the remote control of a printer due to the dynamic output produced.

While we have disclosed several embodiments of the present invention, it is to be understood that these embodiments are given by example only and not in a limiting sense.

We claim:

1. A dynamic display of the contents of a magnetic core register comprising:
- at least one unit register;
- a display means having a common terminal operatively connected to said unit register and 10 numeral terminals comprising a plurality of Nixie tubes equal to the number of units of said unit register;
- a 10-progress ring counter having output terminals comprising 10 number terminals connected respectively to said 10 numeral terminals of said display means;
- said unit register and said ring counter being adapted to concurrently receive common stepping pulses;
- said 10 numeral terminals of said display means being successively driven and switched over by said 10 number terminals, respectively, the latter being successively driven and switched over by said stepping pulses; and
- said display means including means for displaying numerals corresponding to a numeral terminal to be displayed and for displaying a numeral corresponding to the contents of said unit register when said common terminal and said numeral terminal are concurrently activated.

2. The dynamic display, as set forth in claim 1, further comprising:
- a coincident circuit connected to the output of said ring counter and to the output of said unit register and operatively connected to said display means;
- a plurality of registers connected with their outputs to said unit register;
- said display means including a plurality of display devices; and
- a unit selecting counter connected with its output to said plurality of registers and operatively to said display devices and for successively reading out said plurality of registers unit by unit on said display devices upon application thereto of a digit pulse series between each two successive stepping pulses, the coincident circuit providing an output when the content of said 10-progress ring counter coincides with that of said unit register.

3. The dynamic display, as set forth in claim 2, further comprising:
- a flip-flop circuit operatively connected to each of said display device and to said coincident circuit and adapted to receive said stepping pulse for resetting same;
- circuit means for operatively connecting said flip-flop circuits with said unit selecting counter so that said flip-flop circuits correspond to a register which is currently read out and is set by coincident output from said coincident circuit, said flip-flop circuits being reset by every next stepping pulse; and
- contents of said registers being successively read out on said display devices in the interval of two successive stepping pulses when a coincident output is produced from said coincident circuit if the content of a register is equal to the numeral terminal of said ring counter to be driven by the second of said two successive stepping pulses and said numeral terminal concurrently operatively connected to activate the corresponding number terminal of said corresponding display means.

4. The dynamic display, as set forth in claim 2, further comprising:
- a flip-flop circuit operatively connected to each of said display devices, and operatively connected to said unit selecting counter and adapted to receive said stepping pulse, and said flip-flop circuits constituting together a shift register to be shifted concurrently with the selection of said register, the content of a register being successively read out on said corresponding display in the interval of two successive stepping pulses, a coincident output being produced when the content of said register is equal to the numeral of said ring counter to be driven by the second of said two successive stepping pulse; and one of said flip-flop circuits at one end being connected to said coincident circuit and set by said coincident output, and all said flip-flop circuits being concurrently reset by the second of said two successive stepping pulses, and a common number terminal of said display device corresponding to a common numeral terminal of said ring counter is driven by the output produced at that time.

5. The dynamic display, as set forth in claim 2, further comprising:

a gate circuit operatively connected to each of said display devices and operatively connected to said unit selecting counter and to the output of said coincident circuit for opening and closing the input of each display device, the digit pulse being cycled a plurality of times between each two successive stepping pulses, and a successive reading-out of the register content on said display register is repeated a plurality of times in the interval of said two successive stepping pulses, the coincident output being produced when the content of a register is equal to the numeral terminal of said ring counter which is currently being driven by said stepping pulses, and a gate circuit operatively connected to a display device corresponding to a register, opening when said register is being selected by said unit selecting counter, and a common numeral terminal of said display device being driven y a coincident output of said coincident circuit; and driving circuits between said display device and said gate circuits, the time constant of which is selected so that a driving output terminates before a following stepping pulse is produced.

6. The dynamic display, as set forth in claim 5, wherein the reading-out of said register in the interval between said successive two stepping pulses is restricted only to a first one.

7. The dynamic display, as set forth in claim 2, wherein a relative lag between the register content and the content displayed on said display devices is provided by reading-out said registers beginning with one of said registers except for the right end of said registers.